United States Patent [19]

ter Hasebrg et al.

[11] Patent Number: 4,929,842
[45] Date of Patent: May 29, 1990

[54] ELECTRO-OPTICAL MEASURING AND TRANSMISSION DEVICE USING OVERLOAD AND OVERVOLTAGE PROTECTION CIRCUITS

[75] Inventors: Jan L. ter Hasebrg, Buchholz; Joachim Nedwig, Ulm; Klaus-Dieter Kruse, Vögelsen, all of Fed. Rep. of Germany

[73] Assignee: Licentia Patent-Verwaltungs GmbH, Frankfurt am Main, Fed. Rep. of Germany

[21] Appl. No.: 352,547

[22] Filed: May 12, 1989

[30] Foreign Application Priority Data

Jul. 15, 1988 [DE] Fed. Rep. of Germany ... 8809093[U]

[51] Int. Cl.$^5$ .............................................. G02B 27/00
[52] U.S. Cl. ................................ 250/551; 250/227.11; 455/603
[58] Field of Search ................ 250/227, 551; 455/602, 455/603, 610

[56] References Cited

U.S. PATENT DOCUMENTS

| | | | |
|---|---|---|---|
| 3,610,938 | 10/1971 | Cook et al. | 250/227 |
| 4,300,166 | 11/1981 | Marey | 455/603 |
| 4,429,231 | 1/1984 | De Loach et al. | 250/227 |
| 4,651,571 | 3/1987 | McGlade | 250/227 |
| 4,764,981 | 8/1988 | Miyahara et al. | 455/603 |
| 4,774,406 | 9/1988 | Chollet et al. | 250/227 |
| 4,794,261 | 12/1988 | Rosen | 250/551 |

Primary Examiner—David C. Nelms
Assistant Examiner—Stephone B. Allen
Attorney, Agent, or Firm—Spencer & Frank

[57] ABSTRACT

The present invention relates to a miniaturized, isotropic electro-optical measuring and transmission device including a measuring head having small exterior dimensions which is supplied only by means of optical conductors and includes an overload protection in the transducer supply and a frequency compensated overvoltage protection in the signal branch.

11 Claims, 1 Drawing Sheet

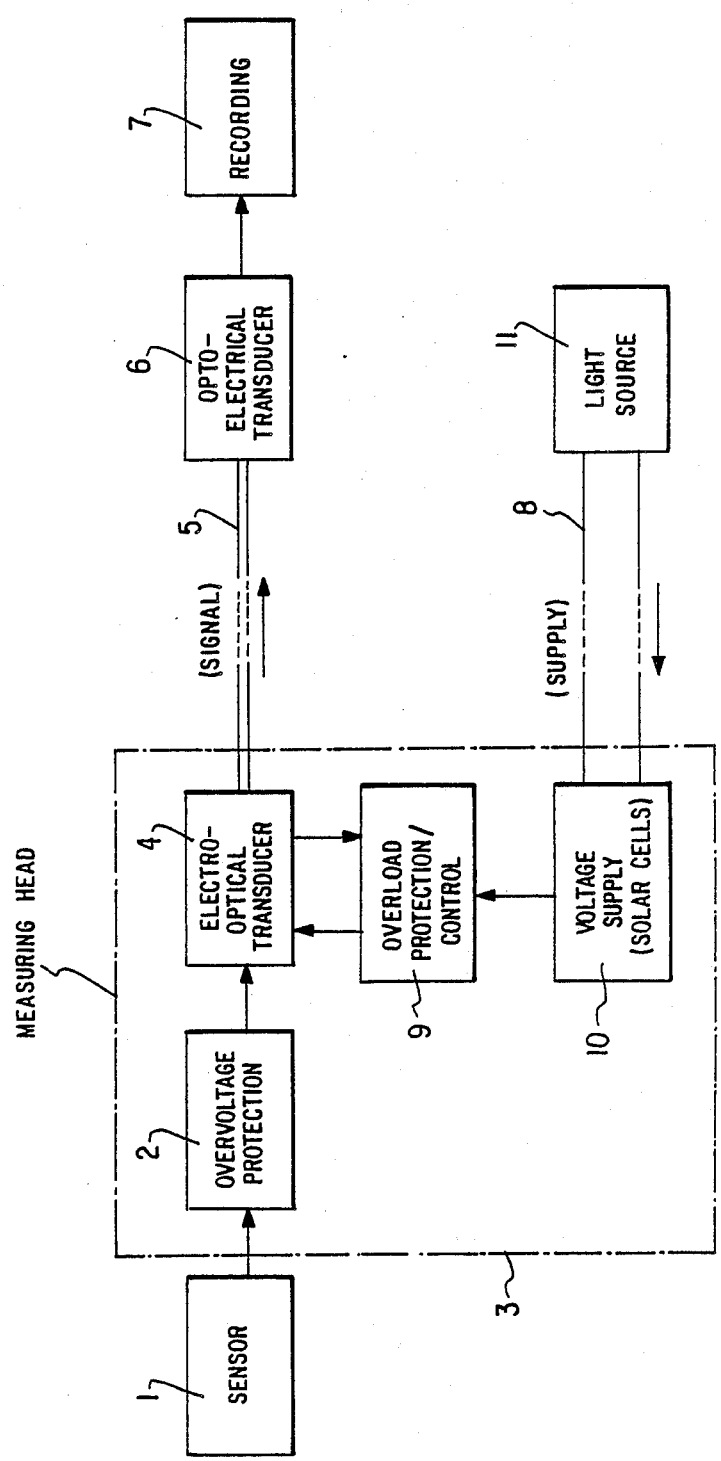

ELECTRO-OPTICAL MEASURING AND TRANSMISSION DEVICE USING OVERLOAD AND OVERVOLTAGE PROTECTION CIRCUITS

REFERENCE TO RELATED APPLICATIONS

The present disclosure relates to the subject matter disclosed in German Application G 88 09 093.0 of July 15th, 1988, the entire specification of which is incorporated herein by reference.

BACKGROUND OF THE INVENTION

The present invention relates to an electro-optical measuring and transmission device connected at an input to a sensor responding to electromagnetic values and at an output with a signal processing device.

Electro-optical measuring and transmission devices serve to pick up and transmit signals at frequencies up to 150 MHz. Such a device is employed in electromagnetic compatibility (EMC) and electromagnetic pulse (EMP) measuring technology if relevant electromagnetic field and line parameters are to be picked up and transmitted when a device is charged by an electromagnetic field.

The field parameters include the electrical field intensity E and the magnetic field intensity H, while the line guided parameters include currents, voltages, and surface charges.

Electro-optical devices of this type are known in principle. However, the existing systems employ an extremely large measuring head characterized by heavy weight, and/or large dimensions. An example of a system having the disadvantage of a large measuring head is the device produced by Thomson CSF (internal document of Thomson CSF FNT/212-07/79, published November 1979).

A large measuring head results in poor manipulatability, strong reactive effects (feedback) and field distortions. The poor manipulatability is furthered by the fact that the measuring head usually is battery operated.

SUMMARY OF THE INVENTION

It is an object of the present invention to provide a novel, miniaturized, isotropic electro-optical measuring and transmission device which employs a measuring head having small exterior dimensions so that electromagnetic field distortions are kept as low as possible and so that measuring locations of difficult accessibility in narrow openings of devices can still be reached.

The above object is accomplished according to the present invention by an electro-optical measuring and transmitting device which comprises a signal input configured for receiving electrical signals from a sensor responsive to an electromagnetic field, a signal output for providing signals to a signal receiving device an electro-optical transducer connected to the signal input for evaluating the signals and providing a corresponding light signal at the signal output, a voltage supply for providing an operating voltage for the transducer, an overload protection circuit connected between the voltage supply and the transducer; and an overvoltage protection circuit, connected between the signal input and the transducer, for protecting the transducer from excessive voltage signals.

According to features of the invention, the transducer is a laser diode or a light emitting diode, and an optical conductor is provided for connecting the signal output to the signal receiving device. Moreover, according to the preferred embodiment of the invention, the voltage supply is a solar cell voltage supply, and a further optical conductor is provided for coupling the solar cell voltage supply to a suitable light source, which for example, may be a laser, an incandescent bulb or a discharge lamp.

BRIEF DESCRIPTION OF THE FIGURES

FIG. 1 is a block diagram of an optically supplied electro-optical measuring and transmission device according to the invention.

DETAILED DESCRIPTION OF PREFERRED EMBODIMENTS

In the construction of a measuring and transmission device according to the present invention, a number of significant design-factors are considered.

Initially, the measuring head 3, FIG. 1, must have extremely small exterior dimensions in order to keep the field distortions created by the presence of the measuring head as small as possible, and to be able to reach difficultly accessible measuring locations in the interior of spatially narrow devices.

In order to achieve maintenance-free operation of the system, supplying the measuring head by way of batteries or other power storage devices mounted within the head is impossible; moreover, such batteries would constitute an unacceptable increase in the volume of the measuring head.

Replacement of metal current supply leads by optical conductors is advantageous to the proper effective operation of the device.

The device must be designed to provide a sufficiently large frequency and dynamic range.

The sensor must be capable of detecting isotropic radiation characteristics in an electromagnetic field.

Finally, the measuring head must be compatible with conventional 50 Ω sensors (e.g. 50 Ω HF current sensors).

According to FIG. 1, the signal to be measured is picked up by an appropriate sensor 1 and is transmitted as an electrical signal through an overvoltage protector circuit 2 to the main element of the measuring head 3, i.e., an electro-optical transducer 4, which preferably is composed essentially of either a laser diode or a light emitting diode. The transducer 4 converts the electrical signal into a proportional optical signal supplied to optical conductor 5.

By way of the optical conductor 5, the optical signal produced by the transducer 4 travels to an opto-electrical transducer 6 and is reconverted to an electrical signal. This electrical signal is then further processed in a recording device 7.

The energy to supply electro-optical transducer 4 is transmitted optically from an external light source 11 to voltage supply 10 disposed in measuring head 3 via a further optical conductor 8. The voltage supply 10 for electro-optical transducer 4 is, in a preferred embodiment, one or a plurality of solar cells which furnish the necessary energy to generate a direct voltage when supplied with energy from a suitable light source 11, e.g. a laser, an incandescent bulb or a discharge lamp.

The measuring head 3 further includes a control and overload protection circuit 9 connecting between the voltage supply 10 and the electro-optical transducer 4. The overload protection, in particular, is of great significance. Due to the specific non-linear characteristic of solar cells, high intensity light flashes on the supply side, caused for example if the light source burns out, may cause an unduly high voltage peak at the power supply input of the laser diode of transducer 4. A control for stabilizing the operating voltage is also accommodated in module or circuit 9. An optically powered electro-optical transmission system for EMP/EMC measurements was published by the authors: K. D. Kruse, J. L. ter Haseborg, J. Nedtwig, at the 6th NEM-Symposium, SRI, Menlo Park, Calif., USA, May 16th–19th, 1988. A detailed description of an overvoltage protector circuit 2, an electro-optical transducer 4 and an overload protection circuit 9 are described in an article by the present inventors in a book by H. K. Schmeer, M. Bleicher, "Elektromagnetische Verträglichkeit", EMV'88, Hüthig Verlag, 1988, pages 155–174. The solar power pack is described in the Federal Republic of Germany patent application DE 37 19 275 A1 filed June 10th, 1987, and published Dec. 22nd, 1988.

With a measuring and transmission device of the above described such configuration according to the present invention, it is possible to accomplish a number of results, including the following.

The device can accomplish low interfering reactions with the electro magnetic field under measurement.

The extremely small exterior dimensions of the measuring head permit the realization of a dot-shaped, isotropic radiation characteristic.

The measuring head has an extremely low weight, and is provided with a special overload protection in the transducer supply.

A frequency compensated overvoltage protection in the signal branch is provided, and the sensor is compatible with sensors constructed according to 50 Ω technology.

It will be understood that the above description of the present invention is susceptible to various modifications, changes and adaptations, and the same are intended to be comprehended within the meaning and range of equivalents of the appended claims.

We claim:

1. An electro-optical measuring and transmitting device comprising:

a signal input configured for receiving electrical signals from a sensor responsive to an electromagnetic field;

a signal output for providing signals to a signal receiving device;

an electro-optical transducer connected to said signal input for evaluating said signals and providing a corresponding light signal at said signal output;

a voltage supply for providing an operating voltage for said transducer;

an overload protection circuit connected between said voltage supply and said transducer; and an overvoltage protection circuit, connected between said signal input and said transducer, for protecting said transducer from excessive voltage signals.

2. An electro-optical measuring and transmissiion device as defined in claim 1, wherein said electro-optical transducer includes a laser diode.

3. An electro-optical measuring and transmission device as defined in claim 1, wherein said electro-optical transducer includes a light emitting diode.

4. An electro-optical measuring and transmission device as defined in claim 1, wherein said device can be used with 50 ohm sensors.

5. An electro-optical measuring and transmission device as defined in claim 1, further including an optical conductor for connecting said signal output to the signal receiving device.

6. An electro-optical measuring and transmission device as defined in claim 5, wherein said voltage supply is a solar cell voltage supply.

7. An electro-optical measuring and transmission device as defined in claim 6, further comprising a further optical conductor for coupling said solar cell voltage supply to a light source.

8. An electro-optical measuring and transmission device as defined in claim 7, wherein said light source has an emission spectrum suitable for reception by said solar cell voltage supply.

9. An electro-optical measuring and transmission device as defined in claim 7, wherein said light source includes a laser.

10. An electro-optical measuring and transmissiion device as defined in claim 7, wherein said light source includes an incandescent bulb.

11. An electro-optical measuring and transmission device as defined in claim 7, wherein said light source includes a discharge lamp.

* * * * *

UNITED STATES PATENT AND TRADEMARK OFFICE
CERTIFICATE OF CORRECTION

PATENT NO. : 4,929,842

DATED : May 29th, 1990

INVENTOR(S) : Jan Luiken ter Haseborg; Klaus-Dieter Kruse; Joachim Nedwig

It is certified that error appears in the above-identified patent and that said Letters Patent is hereby corrected as shown below:

In the heading of the patent under [75] please change

"Jan L. ter Hasebrg" to --Jan L. ter Haseborg--.

Signed and Sealed this

First Day of October, 1991

Attest:

HARRY F. MANBECK, JR.

Attesting Officer

Commissioner of Patents and Trademarks